(12) United States Patent
Talyansky et al.

(10) Patent No.: US 9,514,346 B2
(45) Date of Patent: Dec. 6, 2016

(54) MULTI-LAYER OPTICAL BARCODE WITH SECURITY FEATURES

(71) Applicants: Vitaly Talyansky, Portland, OR (US); Edward Talyansky, Battle Ground, WA (US); Jose Gasque, Vancouver, WA (US); Jason Moore, Vancouver, WA (US); Justin Foster, Portland, OR (US)

(72) Inventors: Vitaly Talyansky, Portland, OR (US); Edward Talyansky, Battle Ground, WA (US); Jose Gasque, Vancouver, WA (US); Jason Moore, Vancouver, WA (US); Justin Foster, Portland, OR (US)

( * ) Notice: Subject to any disclaimer, the term of this patent is extended or adjusted under 35 U.S.C. 154(b) by 304 days.

(21) Appl. No.: 14/272,341

(22) Filed: May 7, 2014

(65) Prior Publication Data

US 2015/0324677 A1     Nov. 12, 2015

(51) Int. Cl.
*G06K 7/12* (2006.01)
*G06K 19/06* (2006.01)
*G06K 19/14* (2006.01)

(52) U.S. Cl.
CPC ............ *G06K 7/12* (2013.01); *G06K 19/0614* (2013.01); *G06K 19/06037* (2013.01); *G06K 19/14* (2013.01); *G06K 19/06159* (2013.01)

(58) Field of Classification Search
USPC .................................................. 235/462.07
See application file for complete search history.

(56) References Cited

U.S. PATENT DOCUMENTS

| | | | | |
|---|---|---|---|---|
| 4,861,993 A | * | 8/1989 | Adachi | G01T 1/2014 250/484.4 |
| 5,210,411 A | * | 5/1993 | Oshima | G06K 7/12 235/462.18 |
| 6,604,683 B1 | * | 8/2003 | Jones | G06K 7/0008 235/462.01 |
| 7,100,831 B2 | * | 9/2006 | Nishioka | G01T 1/2014 235/462.25 |
| 7,536,553 B2 | * | 5/2009 | Auslander | B41M 3/144 235/462.34 |
| 2005/0064435 A1 | * | 3/2005 | Su | B82Y 5/00 435/6.11 |

* cited by examiner

*Primary Examiner* — Michael G Lee
*Assistant Examiner* — David Tardif (57) ABSTRACT

A multi-layer optical barcode with security features is described herein. An example method includes illuminating a first phosphor layer on a substrate with light having a first wavelength, wherein the first phosphor layer has luminescent properties such that when it is illuminated by light having the first wavelength, it emits light having a second wavelength, the first phosphor layer is divided into a first two-dimensional grid of cells arranged in a first spatial pattern, wherein each cell of the first phosphor layer corresponds to one bit of an identification code, a first portion of the first phosphor layer is removed from a first number of cells of the first two-dimensional grid of cells to expose the substrate for the first number of cells, capturing a first image of the light emitted by the first phosphor layer having the second wavelength, determining whether the first phosphor layer is authentic based on the first image, and determining the identification code based on the first image.

17 Claims, 9 Drawing Sheets

MULTI-LAYER OPTICAL BARCODE WITH SECURITY FEATURES

FIELD OF THE DISCLOSURE

The present disclosure relates generally to product authentication and, more particularly, to a multi-layer optical barcode with security features.

BACKGROUND

Products can include an optical barcode. The optical barcode can be used to authenticate and/or identify a product.

DETAILED DESCRIPTION

Counterfeit products can cause significant economic and other damage to both the purveyor of authentic non-counterfeit products and consumers of the counterfeit products. One method to prevent counterfeiting of products is to equip a product or a product packaging with an optical barcode made from special materials that can be read with a probe. Counterfeit products will not have such an optical barcode made from the proper materials and therefore will not be authenticated when tested with the probe.

One type of special material that can be used for an optical barcode is inorganic ceramic materials known as phosphors. Phosphors have the optical property of luminescence. Luminescence is a physical property of phosphors that manifests in such a way that when a phosphor is illuminated with light of a particular wavelength (the phosphor's excitation wavelength), the phosphors emit light at a different wavelength (the phosphor's emission wavelength).

Phosphors can be used as a security feature on products and/or their packaging. A small amount of a particular phosphor can be affixed to a product. The product can then be tested for authenticity by illuminating the phosphor with light at the excitation wavelength of the phosphor. If the product has the phosphor affixed to it, the phosphor will luminesce and emit light that can be detected. If the product does not have the phosphor affixed to it, there will be no luminescent emission. Therefore, the product's authenticity can be determined by illuminating the phosphor on the product with light of the appropriate wavelength and detecting whether the product emits the expected luminescent response.

In addition to authenticating a product by detecting the presence of a particular phosphor, the phosphor can be manufactured in such a way so as to specifically identify the particular product being authenticated. The phosphor can be manufactured such that different portions of it emit light at different emission wavelengths when illuminated with light having one or more excitation wavelengths. By manipulating the portions that so luminesce, the phosphor can act as an optical barcode to mark the product being authenticated with a unique ID.

Example methods, apparatus, and/or articles of manufacture disclosed herein provide a multi-layer optical barcode with security features. In examples disclosed herein, an optical barcode consists of one or more layers of phosphors with each layer having different luminescent properties (i.e., different excitation and/or emission wavelengths). In examples disclosed herein, an optical barcode is authenticated by illuminating it with light having a wavelength equal to the excitation wavelength of one or more phosphor layers on the barcode and detecting a luminescent response. In examples disclosed herein, each phosphor layer has certain portions removed to imprint a unique ID onto the optical barcode that can be read by illuminating the barcode and detecting a luminescent response from each portion of the barcode.

Example methods, apparatus, and/or articles of manufacture disclosed herein provide a probe to authenticate a product having an optical barcode and to read the ID from the barcode by illuminating the barcode with light of the appropriate wavelength or wavelengths and detecting one or more luminescent responses. In examples disclosed herein, the probe illuminates the optical barcode with light having the excitation wavelength or wavelengths of the phosphor or phosphors on the barcode and detects light emitted by the optical barcode having the emission wavelength of the phosphor or phosphors on the barcode.

Figure 1:
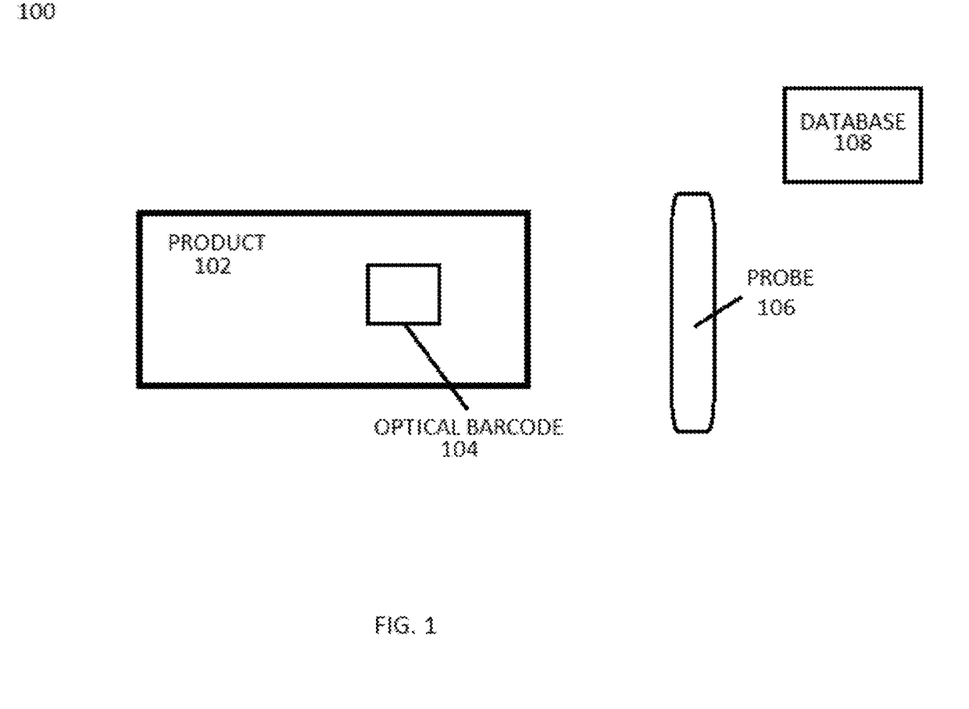
FIG. 1 is a block diagram of a system utilizing a multi-layer optical barcode with security features in accordance with the teachings of this disclosure.

FIG. 1 is a block diagram of a system 100 utilizing a multi-layer optical barcode with security features in accordance with the teachings of this disclosure. The example system 100 of FIG. 1 includes a product 102, an optical barcode 104, a probe 106 and a database 108. The example product 102 may be an electronic component, a consumer good, a packaging for a consumer good or any other product. The example optical barcode 104 is discussed further in connection with FIGS. 2-5. The example probe 106 is discussed further in connection with FIG. 6. The example database 108 communicates with the example probe 106 and stores information transmitted by the probe 106. The example database 108 may be any type of electronic storage medium. The example probe 106 may communicate with the example database 108 directly via a physical connection or remotely via a wireless, network, internet, intranet or other connection.

Figure 2:
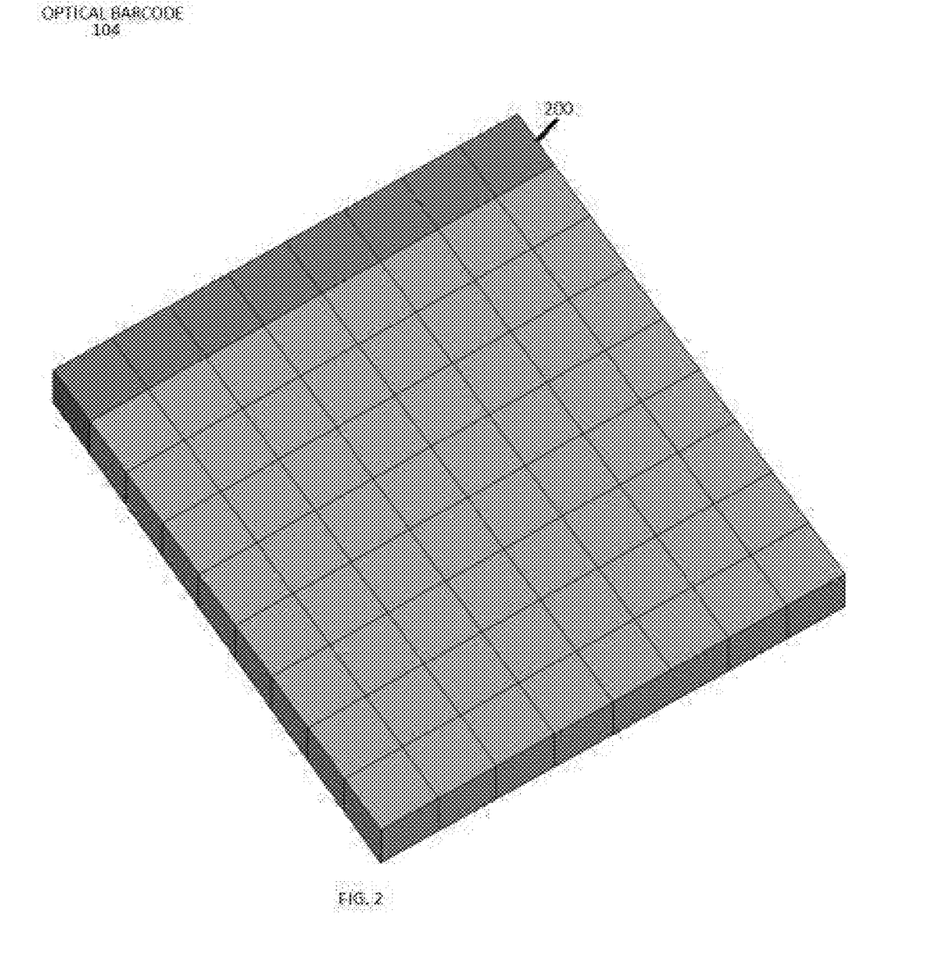
FIG. 2 is a block diagram of a one-layer optical barcode.

FIG. 2 is a block diagram of an example optical barcode 104 of FIG. 1 with a single phosphor layer. The example optical barcode 104 of FIG. 2 consists of a layer of phosphor divided into a grid pattern on top of a substrate. In the illustrated example, the optical barcode 104 is approximately 100 microns wide, 100 microns long and 3 microns thick. However, in other examples, the optical barcode 104 may have any other larger or smaller dimensions.

In the illustrated example of FIG. 2, when the phosphor of the optical barcode 104 is illuminated by light at the excitation wavelength of the phosphor, it emits light at its emission wavelength. Therefore, the product 102 with the optical barcode 104 can be authenticated by illuminating the optical barcode 104 with light of the appropriate wavelength and detecting the luminescent response. If the expected luminescent response is not detected, the product 102 is deemed not authentic (i.e., it is a counterfeit product or it has been tampered with).

In addition to using the optical barcode 104 to authenticate the product 102, the optical barcode 104 provides the product 102 with a unique ID. The example optical barcode 104 is divided into a grid pattern of cells. In the example of FIG. 2, the optical barcode 104 is divided into a 8×9 grid pattern with 72 cells. In other examples, the optical barcode 104 may be divided into a grid pattern of any number of cells. In the example of FIG. 2, 64 cells (i.e., an 8×8 grid portion) of the optical barcode 104 are used for the bits of the ID of the barcode. In the example of FIG. 2, the cells in row 200 are used as orientation elements. In other examples, other combinations of cells can be used as orientation elements and/or ID bits.

In the example of FIG. 2, an 8×8 portion of the grid of the optical barcode 104 consisting of 64 cells are used as bits for the ID of the optical barcode 104. Each of these cells represents a bit with a value of either '1' or '0' and each cell represents one bit of an ID for the optical barcode 104. Thus, the 8×8 grid portion contains a 64-bit ID which can represent $2^{64}$ or about $1.8 \times 10^{19}$ unique IDs. During manufacture of the optical barcode 104, if a particular cell is to represent a '1', the phosphor layer for that cell is left intact. If a particular cell is to represent a '0', the phosphor layer for that cell is removed, thereby exposing the substrate below that cell. In other examples, if a cell is to represent a '1', the phosphor layer for that cell is removed and if a cell is to represent a '0', the phosphor layer for that cell is left intact. Optical barcodes can be manufactured in a way to give sequential ID's to subsequently manufactured optical barcodes or the optical barcodes may be manufactured to give subsequently produced optical barcodes an ID assigned randomly or through some other algorithm or process. However, each manufactured optical barcode should have a unique ID and no optical barcode should have the same ID as any other optical barcode.

Figure 3:
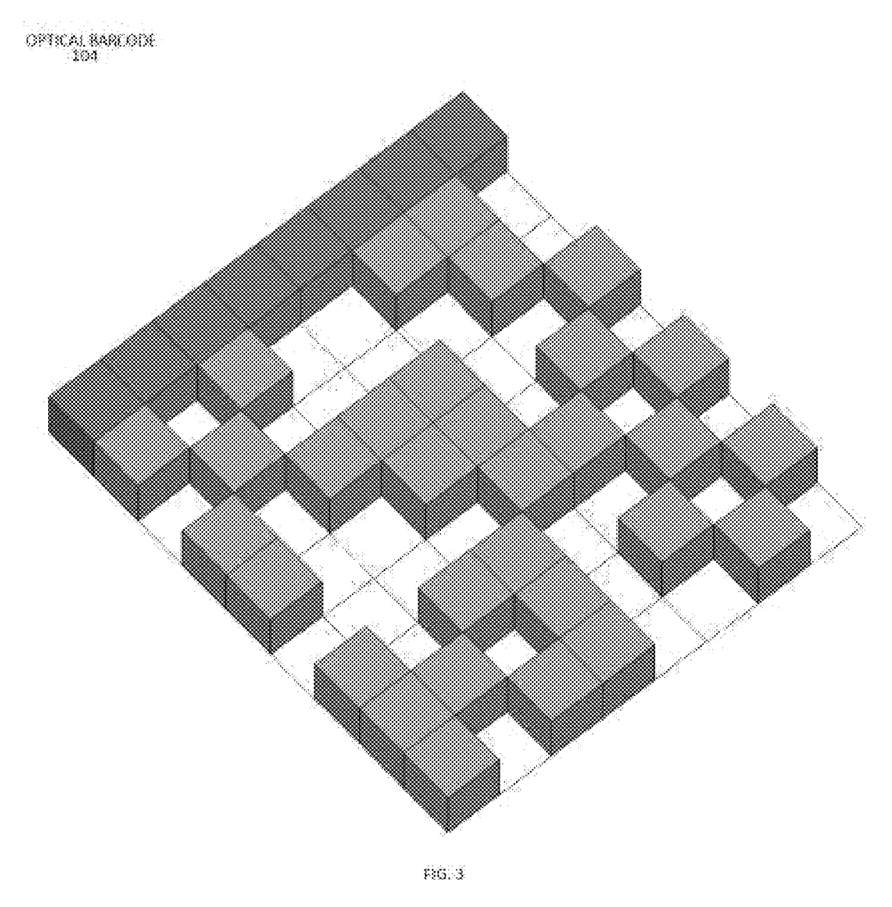
FIG. 3 is a block diagram of a one-layer optical barcode.

FIG. 3 illustrates an example optical barcode 104 where the phosphor layer has been removed for certain cells, exposing the substrate for those cells. The substrate does not have luminescent properties. Therefore, when the example optical barcode 104 is illuminated by light at the excitation wavelength of the phosphor, the cells where the phosphor layer remains will emit light at the emission wavelength of the phosphor and the cells where the phosphor layer is removed will not emit light. Thus, in the example of FIG. 3, the example probe 106 can detect the unique ID of the example optical barcode 104 by illuminating it with light at the excitation wavelength of the phosphor and detecting the luminescent response.

In the example of FIG. 2, the cells of row 200 are used for orientation purposes. When the example optical barcode 104 is affixed to a product, it is important to know which cells represent each bit of the ID. The orientation cells in row 200 can assure that the orientation of the example optical barcode 104 is always known by always having the same pattern of '1's and '0's (i.e., the phosphor layer removed on the same cells) in the row of orientation cells for every optical barcode. For example, the orientation cells in row 200 may all be set to '1' (i.e., they may all have the phosphor left intact) or they may all be set to '0' (i.e., they may al have the phosphor removed) or the orientation cells in row 200 may be set to any combination of '1's and '0's. So long as the row of cells on the optical barcode 104 opposite from the orientation cells in row 200 are not set to that same pattern (i.e., any IDs that would use that particular pattern on the row of cells opposite the orientation cells in row 200 are never used), the proper orientation of the cells on the optical barcode 104 will always be known regardless of the physical orientation of the optical barcode 104 on the product 102.

Figure 4:
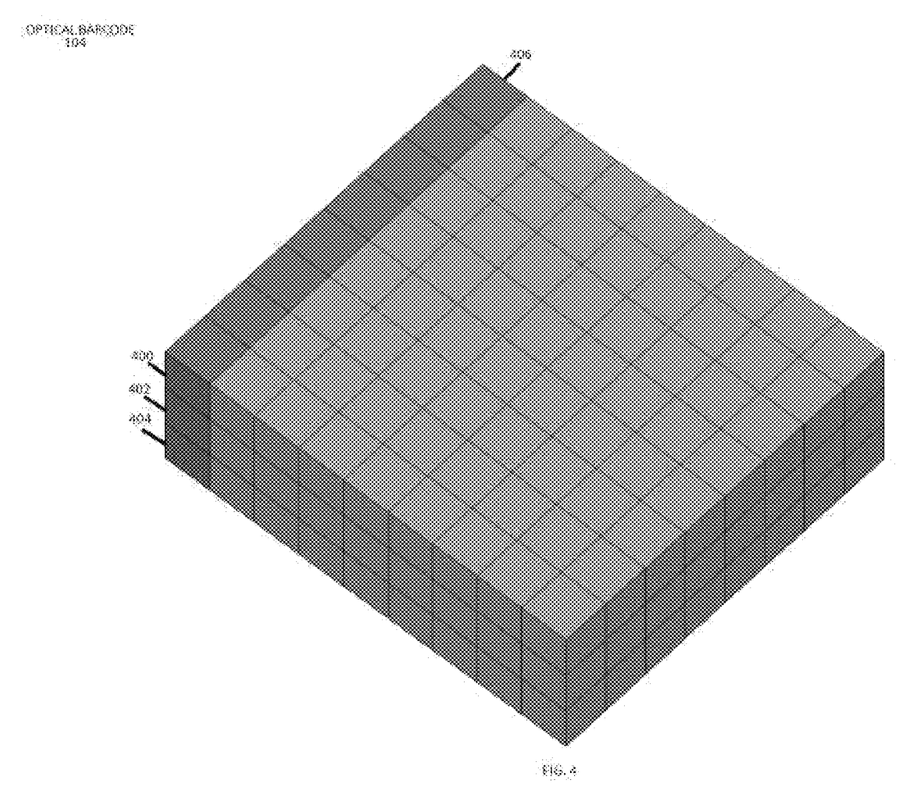
FIG. 4 is a block diagram of a three-layer optical barcode.

FIG. 4 is a block diagram of an example multi-layer optical barcode 104 of FIG. 1. In the example of FIG. 4, the optical barcode 104 has three phosphor layers, a top layer 400, a middle layer 402 and a bottom layer 404 all sitting on top of a substrate. In other examples, the optical barcode 104 may consist of two layers of phosphor or more than three layers of phosphor. In the illustrated example of FIG. 4, each of the phosphor layers 400, 402 and 404 have luminescent properties with different excitation wavelengths and different emission wavelengths. In some examples, each phosphor layer of the optical barcode 104 has the same excitation wavelength but different emission wavelengths. In other examples, each phosphor layer of the optical barcode 104 has the same emission wavelength but different excitation wavelengths. In the example of FIG. 4, the product 102 with the optical barcode 104 can be authenticated by illuminating the optical barcode 104 with light at the excitation wavelength of one or more of the phosphor layers and detecting the luminescent response. If the expected luminescent response is not detected, the product 102 is deemed not authentic.

In addition to allowing the product 102 to be authenticated, the optical barcode 104 gives the product 102 a unique ID. In the example of FIG. 4, the optical barcode 104 is divided into a 9×8 grid of cells. In other examples, the optical barcode 104 may be divided into a grid of any number of cells with any dimensions. In the example of FIG. 4, an 8×8 grid portion of the optical barcode 104 (i.e., 64 cells) is used for the ID of the barcode. In other examples, any number of cells may be used for the ID of the optical barcode 104. In the example of FIG. 4, the cells of row 406 on the optical barcode 104 are used as orientation elements. In other examples, any cells on the optical barcode 104 may be used as orientation elements.

Figure 5:
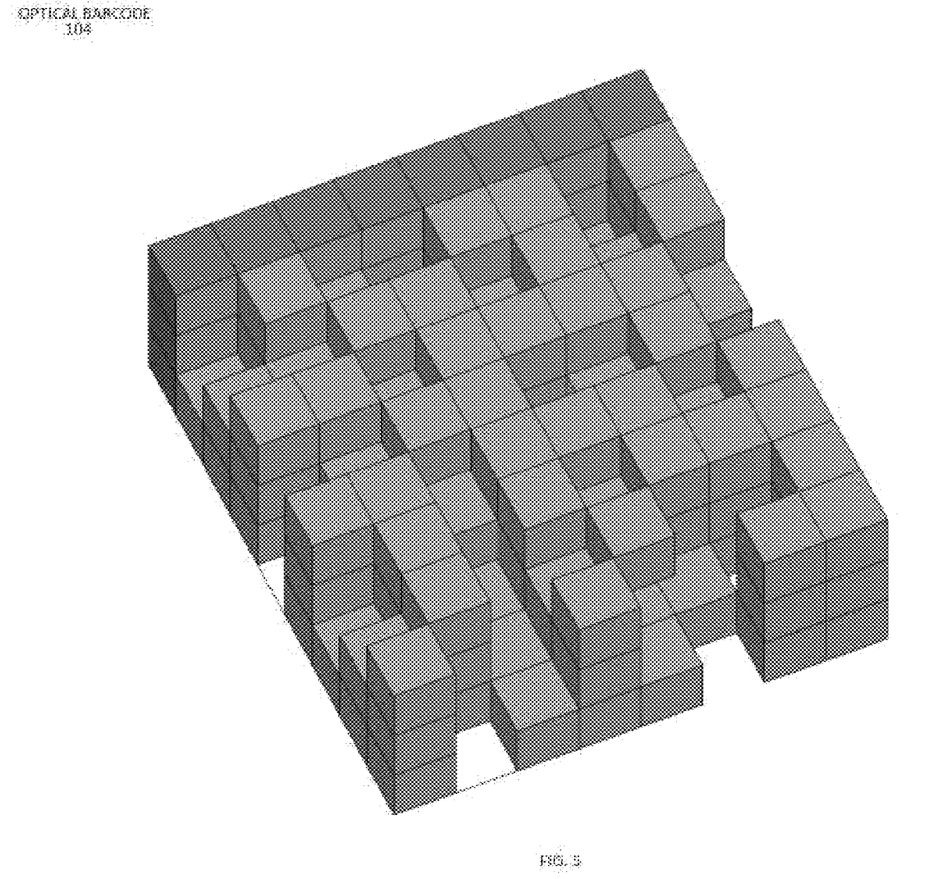
FIG. 5 is a block diagram of a three-layer optical barcode.

In the example of FIG. 4, an 8×8 grid portion of the optical barcode 104 is used to represent a unique ID for the optical barcode 104. Each cell of the optical barcode 104 can have either the top layer 400 exposed, the middle layer 402 exposed, the bottom layer 404 exposed or the substrate exposed. In the example of FIG. 4, if the top layer 400 of a cell is exposed, the cell will emit light at the emission wavelength of phosphor layer 400 when illuminated by light at the excitation wavelength of phosphor layer 400. If the middle layer 402 of a cell is exposed, the cell will emit light at the emission wavelength of phosphor layer 402 when illuminated by light at the excitation wavelength of phosphor layer 402. If the bottom layer 404 of a cell is exposed, the cell will emit light at the emission wavelength of phosphor layer 404 when illuminated by light at the excitation wavelength of phosphor layer 404. If the substrate of a cell is exposed, the cell will not luminesce or emit light in response to illumination. Thus, each cell represents one digit of an ID for the example optical barcode 104 and each cell can take on one of four states (i.e., phosphor layer 400 exposed, phosphor layer 402 exposed, phosphor layer 404 exposed, substrate exposed). Therefore, in the example of FIG. 4 with an 8×8 grid of cells use for the ID of the optical barcode 104, the optical barcode 104 can be used to represent $4^{64}$ or about $3.4 \times 10^{38}$ unique IDs. FIG. 5 illustrates an example optical barcode 104 where one or more of the phosphor layers have been removed from certain cells, exposing different phosphor layers and/or the substrate for each cell.

In the example of FIG. 4, the cells of row 406 are used for orientation purposes, as described above in connection with FIG. 2. The orientation cells in row 406 can assure that the orientation of the example optical barcode 104 is always known by always having the same pattern in the orientation cells of row 406 for every optical barcode. In the illustrated example of FIG. 4, the orientation cells in row 406 all have phosphor layers 400, 402 and 404 exposed thereby exposing the substrate. Thus, those cells will not luminesce when illuminated and can be used to determine the orientation of the cells on the example optical barcode 104. So long as the row of cells on the optical barcode 104 opposite from the orientation cells in row 406 are not set to that same pattern (i.e., any IDs that would use that particular pattern on the row of cells opposite the orientation cells in row 406 are never used), the proper orientation of the cells on the optical barcode 104 will always be known regardless of the physical orientation of the optical barcode 104 on the product 102.

In the illustrated example, the phosphor layers of the optical barcode 104 of FIGS. 1-5 are manufactured using chemical vapor deposition. In other examples, the phosphor layers of the optical barcode 104 are manufactured using vacuum thermal deposition or other known techniques. In the illustrated example, each phosphor layer of the example optical barcode 104 is grown as a single crystal structure using chemical vapor deposition on an inert, insulating substrate that comes in large sheets. In other examples, a polycrystalline structure can be used instead of a single crystal. In the illustrated example where single crystals are used for the phosphor layers, the luminescent emission from the optical barcode 104 in response to illumination by polarized light will also be polarized. In some examples, the probe 106 illuminates the optical barcode 104 with polarized light. In those examples, the probe 106 detects the polarization of light emitted by the optical barcode 104 in response to the illumination. In these examples, if the polarity of the light detected by the probe 106 does not match the expected polarity, the optical barcode 104 and the product 102 it is affixed to are deemed not authentic.

In the example of FIGS. 4-5 or other examples with multiple phosphor layers, each phosphor layer is grown as a single crystal structure and the phosphor layers are then stacked on the substrate and each other to form the multiple phosphor layer structure. In some examples, each phosphor layer is covered with a thin layer of metal. In the illustrated example, the removal of the phosphor layer or layers from the various cells to imprint the unique ID of the optical barcode 104 is accomplished using laser ablation. In other examples, the unique ID is imprinted onto the barcode 104 using electron beam ablation or other known techniques. In example where each phosphor layer is covered with a thin layer of metal, the unique ID is imprinted by cutting through the metal above the appropriate cells using known techniques for ablating metal.

In some examples, the optical barcode 104 is manufactured with a forensic security feature. In these examples, the single crystal structure of the phosphor layers is doped with two or more elements in specific ratios to create an elemental signature for the phosphor. This allows the phosphor to be tested for the elemental signature (i.e., the phosphor can be analyzed using mass spectrometry or other methods to determine if it contains the appropriate ratios of the doped elements). If the elemental signature is not present, then the phosphor is deemed not authentic.

Figure 6:
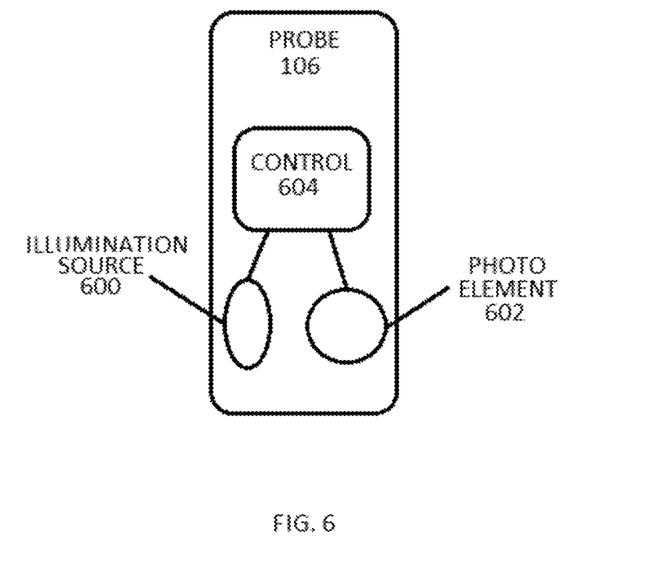
FIG. 6 is a block diagram of the example probe of FIG. 1.

FIG. 6 is a block diagram of the example probe 106 of FIG. 1. The example probe 106 is a hand-held device that includes an illumination source 600, a photo element 602 and a control 604. In the illustrated example, the illumination source 600 is a laser that emits light at wavelengths equal to the various excitation wavelengths of the optical barcode 104 (e.g., in the example of FIGS. 3 and 4 where there are three phosphor layers, the illumination source 600 emits light at wavelengths equal to the excitation wavelengths of each phosphor layer). In the illustrated example, the illumination source 600 consists of multiple lasers that each emit light at a different wavelength corresponding to an excitation wavelength of one of the phosphor layers of the optical barcode 104. In other examples, the illumination source 600 is a single laser capable of emitting light at multiple wavelengths equal to the excitation wavelengths of the phosphor layers of the optical barcode 104. In some examples, the illumination source 600 consists of one or more light emitting diodes or other light sources. In examples where the optical barcode 104 consists of multiple phosphor layers, the illumination source 600 illuminates the optical barcode 104 multiple times with light at different wavelengths (i.e., for each phosphor layer on the optical barcode 104, the illumination source 600 illuminates the optical barcode 104 with light at the excitation wavelength of the phosphor layer).

In the illustrated example, the photo element 602 detects light emitted by each of the cells of the optical barcode 104 and captures one or more images of the light emitted by the optical barcode 104. In the illustrated example, the photo element 602 is a charge coupled device (CCD) camera. In other examples, the photo element 602 may consist of one or more photodiodes or other devices or elements capable of detecting the light emitted by the cells of the optical barcode 104. In examples where the optical barcode 104 consists of multiple phosphor layers, the photo element 602 captures multiple images of the optical barcode 104 sequentially (i.e., for each phosphor layer on the optical barcode 104, the photo element 602 captures an image of the optical barcode 104 after the illumination source 600 illuminates the optical barcode 104 with light at the excitation wavelength of the phosphor layer).

The example control 604 communicates with and controls the example illumination source 600 and the example photo element 602. The example control 604 receives images captured by the example photo element 602. The example control 604 also communicates with and sends data to the example database 108 of FIG. 1. The example control 604 determines whether the example product 102 with the example optical barcode 104 is authentic by analyzing the images captured by the example photo element 602 as described above in connection with FIG. 205. The example control 604 determines the orientation of the images captured by the example photo element 602 by analyzing the images based on the orientation elements on the optical barcode 104 as described above in connection with FIGS. 2-5. The example control 604 decodes the ID for the example optical barcode 104 by analyzing the images captured by the example photo element 602 and determining which phosphor layer is exposed for each cell on the optical barcode 104. The example control 604 transmits whether the example product 102 is authentic to the example database 108. If the example control 604 determines that the example product 102 is authentic, the control 604 transmits the decoded ID to the example database 108. In some examples, the control 604 gives a visual, audio or other indication of whether the product 102 is deemed authentic and/or the decoding of the ID on the optical barcode 104 to the user of the probe 106 after testing the product 102.

While an example manner of implementing the multi-layer optical barcode with security features been illustrated in FIGS. 1-6, one or more of the elements, processes and/or devices illustrated in FIGS. 1-6 may be combined, divided, re-arranged, omitted, eliminated and/or implemented in any other way. Further, the example product 102, the example optical barcode 104, the example probe 106, the example database 108, the example illumination source 600, the example photo element 602, the example control 604 and/or, more generally, the example system 100 of FIGS. 1-6 may be implemented by hardware, software, firmware and/or any combination of hardware, software and/or firmware. Thus, for example, any of the example product 102, the example optical barcode 104, the example probe 106, the example database 108, the example illumination source 600, the example photo element 602, the example control 604 and/or, more generally, the example system 100 of FIGS. 1-6 could be implemented by one or more circuit(s), programmable processor(s), application specific integrated circuit(s) (ASIC(s)), programmable logic device(s) (PLD(s)), microprocessor(s), hardware processor(s), and/or field programmable logic device(s) (FPLD(s)), etc. When any of the system or apparatus claims of this patent are read to cover a purely software and/or firmware implementation, at least one of the example product 102, the example optical barcode 104, the example probe 106, the example database 108, the example illumination source 600, the example photo element 602, the example control 604 and/or, more generally, the example system 100 of FIGS. 1-6 is hereby expressly defined to include a tangible computer readable storage medium such as a memory, DVD, CD, Blu-ray, etc. storing the software and/or firmware. Further still, the example product 102, the example optical barcode 104, the example probe 106, the example database 108, the example illumination source 600, the example photo element 602, the example control 604 and/or, more generally, the example system 100 of FIGS. 1-6 may include more than one of any or all of the illustrated elements, processes and devices.

Figure 7:
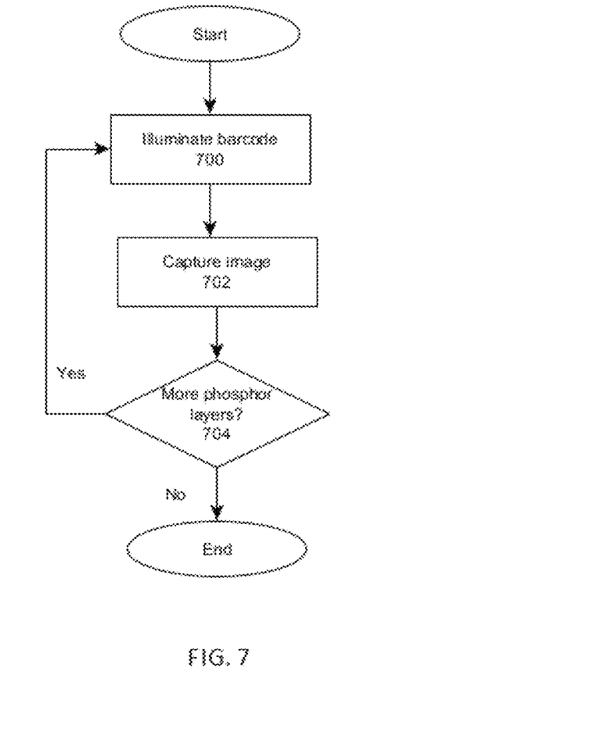
FIG. 7 is a flowchart representative of example machine readable instructions that may be executed to implement the example probe of FIGS. 1 and 6.
Figure 8:
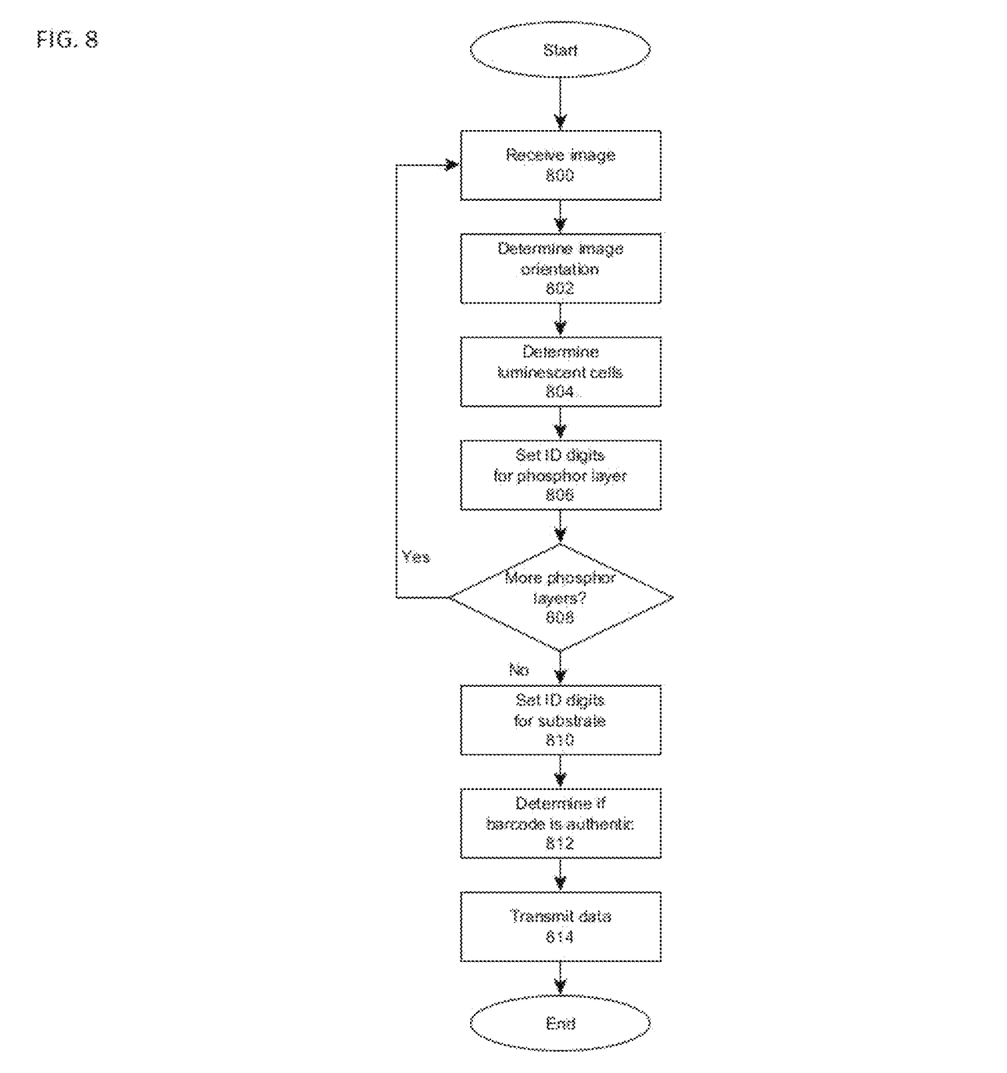
FIG. 8 is a flowchart representative of example machine readable instructions that may be executed to implement the example control of FIG. 6.

FIG. 7 is a flowchart representative of example machine readable instructions for implementing the example probe 106 of FIGS. 1 and 6. FIG. 8 is a flowchart representative of example machine readable instructions for implementing the example control 604 of FIG. 6. In the example flowcharts of FIGS. 7 and 8, the machine readable instructions comprise program(s) for execution by a processor such as the processor 912 shown in the example computer 900 discussed below in connection with FIG. 9. The program(s) may be embodied in software stored on a tangible computer readable storage medium such as a CD-ROM, a floppy disk, a flash drive, a hard drive, a digital versatile disk (DVD), a Blu-ray disk, or a memory associated with the processor 912, but the entire program and/or parts thereof could alternatively be executed by a device other than the processor 912 and/or embodied in firmware or dedicated hardware. Further, although the example program(s) is described with reference to the flowcharts illustrated in FIGS. 7 and 8, many other methods of implementing the example probe 106 of FIGS. 1 and 6 and/or the example control 604 of FIG. 6 may alternatively be used. For example, the order of execution of the blocks may be changed, and/or some of the blocks described may be changed, eliminated, or combined.

As mentioned above, the example processes of FIGS. 7 and 8 may be implemented using coded instructions (e.g., computer readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable storage medium is expressly defined to include any type of computer readable storage device and/or disk and to exclude propagating signals. Additionally or alternatively, the example processes of FIGS. 7 and 8 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable storage medium is expressly defined to include any type of computer readable storage device and/or disk and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

FIG. 7 begins when the example illumination source 600 illuminates the example optical barcode 104 with light at the excitation wavelength of one of the phosphor layers on the optical barcode 104 (block 700). This illumination causes a luminescent response from the appropriate phosphor layer on the optical barcode 104 (i.e., the phosphor layer with the excitation wavelength that illuminated the optical barcode 104). This luminescent response causes the cells of the example optical barcode 104 with that phosphor layer exposed to emit light at the emission wavelength of the phosphor layer. The example photo element 602 captures an image of this luminescent emission and sends this image to the example control 604 (block 702).

The example control 604 then determines whether the example optical barcode 104 needs to be illuminated additional times for additional phosphor layers (e.g., in the example of FIGS. 4-5, there are three phosphor layers, thus the optical barcode needs to be illuminated three times, once at each of the excitation wavelengths of the three phosphor layers) (block 704). If the example control 604 determines that the example optical barcode 104 needs to be illuminated again (block 704), then control returns to block 700 and the example illumination source 600 illuminates the optical barcode 104 with light at a wavelength corresponding to the excitation wavelength of a different phosphor layer on the optical barcode 104. If the example control 604 determines that the example optical barcode 104 does not need to be illuminated again (i.e., the example illumination source 600 has illuminated the optical barcode 104 once for each phosphor layer on the optical barcode 104) (block 704), then the example of FIG. 7 ends.

FIG. 8 begins when the example control 604 receives an image from the example photo element 602 (block 800). Every image that the example photo element 602 sends to the example control 604 is an image of the example optical barcode 104 captured after the example illumination source 600 illuminates the optical barcode 104 with light at a wavelength equal to the excitation wavelength of one of the phosphor layers on the optical barcode 104. Thus, every image received by the example control 604 shows which cells of the example optical barcode 104 luminesce in response to illumination at a particular wavelength (i.e., the cells that luminesce will appear bright in the received image while the cells that do not luminesce will appear dark). Accordingly, every image received by the example control 604 shows whether a phosphor layer is exposed for each cell of the example optical barcode 104. By receiving multiple images of the example optical barcode 104 after illumination at each of the excitation wavelengths of the phosphor layers of the optical barcode 104, it can be determined which phosphor layer is exposed for every cell on the optical barcode 104.

After the example control 604 receives an image from the example photo element 602 (block 800), the control 604 determines the orientation of the received image by finding the orientation cells (block 802). In the illustrated example of FIGS. 4 and 5, the orientation cells are a row of cells at the top of the example optical barcode 104 that all have the substrate exposed and therefore will not luminesce in response to illumination. Thus, the example control 604 determines the orientation of a received image by finding the row of cells at one end of the image that has no luminescent response (i.e., the row of cells that are dark in the received image).

After the example control 604 determines the orientation of the received image (block 802), the control 604 determines which of the ID cells (i.e., which of the cells that are used to imprint the ID onto the example optical barcode 104) luminesce in the received image (i.e., which cells in the received image are bright) (block 804). The cells in the received image that luminesce have the phosphor layer exposed with the excitation wavelength that illuminated the example optical barcode prior to the image being captured by the example photo element 602.

After the example control 604 determines which cells are luminescent in the received image (block 804), the control 604 sets the digits of the barcode ID that correspond to those cells to the appropriate values based on which phosphor layer is exposed (block 806). As discussed above in connection with FIGS. 2-5, certain cells of the example optical barcode 104 (e.g., an 8×8 grid portion in FIGS. 2-5) are used to imprint a unique ID onto the optical barcode 104. Each of these cells represents one position or digit of the ID (e.g., one cell represents the first digit of the ID, another cell represents the second digit of the ID, etc.). Furthermore, each ID cell can take on any one of a number of states equal to the number of phosphor layers on the optical barcode plus one (i.e., one state for each phosphor layer and one state for the substrate). For example, in the example of FIGS. 2 and 3 where the optical barcode 104 has one layer, each cell can either have the phosphor exposed or the substrate exposed, corresponding to two possible states. These two states can be represented as '0' and '1'. In the examples of FIGS. 4 and 5 where the optical barcode 104 has three layers, each cell can have any one of the three phosphor layers or the substrate exposed, corresponding to four possible states. These four states can be represented as 'a', 'b', 'c', and 'd' or any other indicia. In block 806, the example control 604 assigns a value to certain digits of the barcode ID based on which cells are bright in the received image and which phosphor layer the received image corresponds to.

After the example control 604 assigns the appropriate values to the appropriate digits of the barcode ID (block 806), the control 604 determines whether additional images corresponding to additional phosphor layers are to be received (i.e., whether the control 604 has received an image corresponding to each phosphor layer on the example optical barcode 104) (block 808). If the example control 604 determines that additional images are to be received (block 808), then control returns to block 800 and an image corresponding to the next phosphor layer is received from the example photo element 602. If the example control 604 determines that no additional images are to be received (block 808), then control passes to block 810.

After the example control 604 determines that no additional images are to be received (block 808), the example control 604 sets the digits of the ID corresponding to the substrate of the example optical barcode 104. The possible states of each cell on the example optical barcode 104 are represented by either exposing one of the phosphor layers or by exposing the substrate. If a particular cell did not luminesce in response to illumination by light at any of the excitation wavelengths of the phosphor layers, then the substrate must be exposed. Thus, in block 810, the example control 604 sets the digits of the ID that correspond to cells that were not previously set to a value to the value corresponding to the substrate. After this is done, all digits of the barcode ID will have been set to a value corresponding to either one of the phosphor layers or to the substrate.

After the example control 604 sets the ID digits for the cells with the substrate exposed (block 810), the control 604 determines whether the example product 102 is authentic (block 812). If the example product 102 is authentic, then the example optical barcode 104 on the product 102 would have luminesced as expected in response to illumination by light at the appropriate wavelengths (i.e., the excitation wavelengths of the various phosphor layers on the optical barcode 104). If the example product 102 is not authentic, then it will not have an authentic optical barcode 104 that luminesces in response to illumination. Therefore, if the example product 102 is not authentic, none of the images received by the example control 604 corresponding to the various phosphor layers on the example optical barcode 104 will indicate luminescence (i.e., all of the cells on each of the received images received will be dark). If this is the case, then the example control 604 determines that the example optical barcode 104 and the example product 102 are not authentic. If this is not the case and the images received by the example control 604 indicate luminesce in response to illumination (i.e., some of the cells on the images received by the control 604 are bright), then the control 604 determines that the example optical barcode 104 and the example product 102 are authentic.

After the example control 604 determines whether the example product 102 is authentic (block 812), the control 604 transmits data to the example database 108 (block 814). The data transmitted by the example control 604 to the example database 108 includes whether or not the example product 102 is authentic and, if the product 102 is deemed authentic, the decoded ID of the optical barcode. The example of FIG. 8 then ends.

Figure 9:
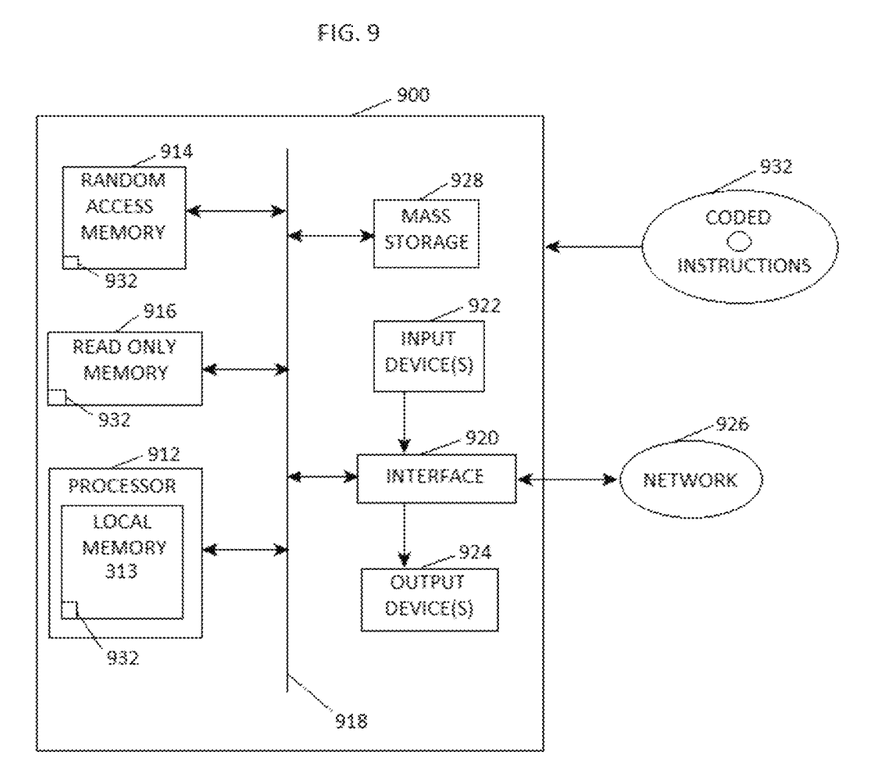
FIG. 9 is a block diagram of an example processing system capable of executing the example machine readable instructions of FIGS. 7 and 8 to implement the example system of FIG. 1.

FIG. 9 is a block diagram of a processor platform 900 capable of executing the instructions of FIGS. 7 and 8 to implement the example optical barcode with security features of FIG. 1. The processor platform 900 can be, for example, a server, a personal computer, an Internet appliance, a DVD player, a CD player, a Blu-ray player, a gaming console, a personal video recorder, a smart phone, a tablet, a printer, or any other type of computing device.

The processor platform 900 of the instant example includes a processor 912. As used herein, the term "processor" refers to a logic circuit capable of executing machine readable instructions. For example, the processor 912 can be implemented by one or more microprocessors or controllers from any desired family or manufacturer.

The processor 912 includes a local memory 913 (e.g., a cache) and is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 also includes an interface circuit 920. The interface circuit 920 may be implemented by any type of interface standard, such as an Ethernet interface, a universal serial bus (USB), and/or a PCI express interface.

One or more input devices 922 are connected to the interface circuit 920. The input device(s) 922 permit a user to enter data and commands into the processor 912. The input device(s) can be implemented by, for example, a keyboard, a mouse, a touchscreen, a track-pad, a trackball, isopoint and/or a voice recognition system.

One or more output devices 924 are also connected to the interface circuit 920. The output devices 924 can be implemented, for example, by display devices (e.g., a liquid crystal display, a cathode ray tube display (CRT), a printer and/or speakers). The interface circuit 920, thus, typically includes a graphics driver card.

The interface circuit 920 also includes a communication device such as a modem or network interface card to facilitate exchange of data with external computers via a network 926 (e.g., an Ethernet connection, a digital subscriber line (DSL), a telephone line, coaxial cable, a cellular telephone system, etc.).

The processor platform 900 also includes one or more mass storage devices 928 for storing software and data. Examples of such mass storage devices 928 include floppy disk drives, hard drive disks, compact disk drives and digital versatile disk (DVD) drives.

The coded instructions 932 of FIG. 9 may be stored in the mass storage device 928, in the volatile memory 914, in the non-volatile memory 916, and/or on a removable storage medium such as a CD or DVD.

Although certain example apparatus, methods, and articles of manufacture have been disclosed herein, the scope of coverage of this patent is not limited thereto. On the contrary, this patent covers all apparatus, methods, and articles of manufacture fairly falling within the scope of the claims of this patent.

What is claimed is:

1. An apparatus comprising:
a first phosphor layer comprised of inorganic, ceramic materials on top of a substrate, the first phosphor layer having luminescent properties such that when it is illuminated by light having a first wavelength, it emits light having a second wavelength, the first phosphor layer is divided into a first two-dimensional grid of cells arranged in a first spatial pattern, wherein each cell of the first two-dimensional grid of cells corresponds to one bit of an identification code, a first portion of the first phosphor layer is removed from a first number of cells of the first two-dimensional grid of cells to expose the substrate for the first number of cells;
and a second phosphor layer on top of the first phosphor layer, the second phosphor layer having luminescent properties such that when it is illuminated by light having a third wavelength, it emits light having a fourth wavelength, the second phosphor layer is divided into a second two-dimensional grid of cells arranged in the first spatial pattern such that each cell of the second two-dimensional grid of cells is directly above a cell of the first two-dimensional grid of cells, wherein each cell of the second two-dimensional grid of cells corresponds to the cell of the first two-dimensional grid of cells below it, a second portion of the second phosphor layer is removed from a second number of cells of the second two-dimensional grid of cells.

2. The apparatus of claim 1, wherein the first phosphor layer is affixed to a product.

3. The apparatus of claim 1, wherein a second portion of the first phosphor layer is removed from a second number of cells of the first two-dimensional grid of cells, wherein the second number of cells are used to identify the orientation of the first phosphor layer based on an image of the first phosphor layer.

4. The apparatus of claim 1, wherein the first phosphor layer is a single crystal structure.

5. The apparatus of claim 1, wherein the first phosphor layer is manufactured using chemical vapor deposition.

6. The apparatus or claim 1, wherein the first portion of the first phosphor layer is removed by laser ablation.

7. The apparatus of claim 1, wherein the first portion of the first phosphor layer is removed by electron beam ablation.

8. The apparatus of claim 1, further comprising a sheet of metal between the first phosphor layer and the second phosphor layer.

9. The apparatus of claim 1, wherein the first phosphor layer is doped with a first amount of a first element and a second amount of a second element to create an elemental signature based on the ratio of the first amount to the second amount.

10. A method comprising:
illuminating a first phosphor layer on a substrate with light having a first wavelength, wherein the first phosphor layer is comprised or inorganic, ceramic materials and the first phosphor layer has luminescent properties such that when it is illuminated by light having the first wavelength, it emits light having a second wavelength, the first phosphor layer is divided into a first two-dimensional grid of cells arranged in a first spatial pattern, wherein each cell of the first phosphor layer corresponds to one bit of an identification code, a first portion of the first phosphor layer is removed from a first number of cells of the first two-dimensional grid of cells to expose the substrate for the first number of cells;
capturing a first image of the light emitted by the first phosphor layer having the second wavelength;
determining whether the first phosphor layer is authentic based on the first image;
illuminating a second phosphor layer on top of the first phosphor layer with light having a third wavelength, the second phosphor layer having luminescent properties such that when it is illuminated by light having a third wavelength, it emits light having a fourth wavelength, the second phosphor layer is divided into a second two-dimensional grid of cells arranged in the first spatial pattern such that each cell of the second two-dimensional grid of cells is directly above a cell of the first two-dimensional grid of cells, wherein each cell of the second two-dimensional grid of cells corresponds to the cell of the first two-dimensional grid of cells below it, a second portion of the second phosphor layer is removed from a second number of cells of the second two-dimensional grid of cells;

capturing an image of the light emitted by the second phosphor layer having the fourth wavelength;

determining whether the second phosphor layer is authentic based on the second image; and determining the identification code based on the first image and the second image.

11. The method of claim 10, further comprising determining the identification code based on the first number of cells of the first two-dimensional grid of cells as shown in the first image.

12. The method of claim 10, further comprising determining the orientation of the first phosphor layer based on a second number of cells of the first two-dimensional grid of cells, wherein a second portion of the first phosphor layer is removed from the second number of cells of the first two-dimensional grid of cells.

13. The method of claim 10, further comprising determining the authenticity of the first phosphor layer based on an elemental signature, wherein the first phosphor layer is doped with a first amount of a first element and a second amount of a second element to create the elemental signature based on the ratio of the first amount to the second amount.

14. The method of claim 10, further comprising determining the identification code based on the first number of cells of the first two-dimensional grid of cells as shown in the first image and the second number of cells of the second two-dimensional grid of cells as shown in the second image.

15. A tangible machine readable storage medium comprising instructions that, when executed, cause a machine to at least:

illuminate a first phosphor layer on a substrate with light having a first wavelength, wherein the first phosphor layer is comprised of inorganic, ceramic materials and the first phosphor layer has luminescent properties such that when it is illuminated by light having the first wavelength, it emits light having a second wavelength, the first phosphor layer is divided into a first two-dimensional grid of cells arranged in a first spatial pattern, wherein each cell of the first phosphor layer corresponds to one bit of an identification code, a first portion of the first phosphor layer is removed from a first number of cells of the first two-dimensional grid of cells to expose the substrate for the first number of cells;

capture a first image of the light emitted by the first phosphor layer having the second wavelength;

determine whether the first phosphor layer is authentic based on the first image;

illuminate a second phosphor layer on top of the first phosphor layer with light having a third wavelength, the second phosphor layer having luminescent properties such that when it is illuminated by light having a third wavelength, it emits light having a fourth wavelength, the second phosphor layer is divided into a second two-dimensional grid of cells arranged in the first spatial pattern such that each cell of the second two-dimensional grid of cells is directly above a cell of the first two-dimensional grid of cells, wherein each cell of the second two-dimensional grid of cells corresponds to the cell of the first two-dimensional grid of cells below it, a second portion of the second phosphor layer is removed from a second number of cells of the second two-dimensional grid of cells;

capture an image of the light emitted by the second phosphor layer having the fourth wavelength;

determine whether the second phosphor layer is authentic based on the second image; and determine the identification code based on the first image and the second image.

16. The storage medium of claim 15, wherein the instructions, when executed, cause the machine to determine the identification code based on the first number of cells of the first two-dimensional grid of cells as shown in the first image.

17. The storage medium of claim 15, wherein the instructions, when executed, cause the machine to determine the identification code based on the first number of cells of the first two-dimensional grid of cells as shown in the first image and the second number of cells of the second two-dimensional grid of cells as shown in the second image.

* * * * *